(12) United States Patent
Ryuuzaki

(10) Patent No.: US 6,449,146 B1
(45) Date of Patent: Sep. 10, 2002

(54) NOTEBOOK PERSONAL COMPUTER MACHINE

(75) Inventor: Masanori Ryuuzaki, Yamagata (JP)

(73) Assignee: NEC Corporation, Tokyo (JP)

( * ) Notice: Subject to any disclaimer, the term of this patent is extended or adjusted under 35 U.S.C. 154(b) by 7 days.

(21) Appl. No.: 09/689,638

(22) Filed: Oct. 13, 2000

(30) Foreign Application Priority Data

Oct. 15, 1999 (JP) .......................................... 11-294505

(51) Int. Cl.$^7$ ................................................. G06F 1/16
(52) U.S. Cl. ...................... 361/683; 361/683; 361/686; 361/679; 381/87; 364/708.1
(58) Field of Search ................................. 361/683, 686, 361/679, 680, 681, 684; 381/87, 300, 335, 104, 109, 150; 364/708.1

(56) References Cited

U.S. PATENT DOCUMENTS 6,040,978 A * 3/2000 Spencer ...................... 361/683

FOREIGN PATENT DOCUMENTS

| JP | 5-324124 | 12/1993 |
| JP | 8-307981 | 11/1996 |
| JP | 3044340 | 10/1997 |
| JP | 9-311776 | 12/1997 |

* cited by examiner

Primary Examiner—Darren Schuberg
Assistant Examiner—Yean-Hsi Chang
(74) Attorney, Agent, or Firm—Whitham, Curtis & Christofferson, PC

(57) ABSTRACT

A notebook personal computer machine includes a first casing containing a computer (CPU), a second casing capable of swinging about the associated hinge portions relative to the first casing, and further a third casing containing speakers and disposed on opposite lateral side edges of the second casing, swinging about the associated hinge portions relative to the second casing. It is adapted to cover the corresponding lateral side edges of the first casing when the second casing is completely folded (closed) onto the first casing. This permits a larger speaker to be mounted externally without modifying the physical size of the hardware machine, with the box containing the speaker being adjustable to any angle such that the exposed portions of the floppy disk drive and so on installed inside the machine body can be protected adequately against any possible scratches, dusts and the like.

9 Claims, 3 Drawing Sheets

NOTEBOOK PERSONAL COMPUTER MACHINE

FIELD OF THE INVENTION

The present invention relates to a notebook personal computer, and more particularly to a notebook personal computer machine having a speaker unit installed therein or thereon.

BACKGROUND OF THE INVENTION

In a conventional notebook personal computer machine, a speaker is usually mounted either inside the casing or lid on which the display screen is located or inside the casing or machine body on which the keyboard is located. In some notebook personal computers, in order to produce the acoustic effect, a separate box that contains a speaker unit as well as a driving means allowing the angle of the sound emission from the speaker unit to be varied is mounted on either or both of the lateral sides of the casing, mostly the casing or lid on which the display screen is located. For example, such notebook personal computer machines are disclosed in the documents, such as the Japanese registered utility model JP-UM-3044340, Japanese Patent Kokai Publication JP-A-5-324124, Japanese Patent Kokai Publication JP-A-8-307981 and Japanese Patent Kokai Publication JP-A-9-311776.

Typically, the display screen and the keyboard may be protected against any physical damages or foreign dusts when the notebook personal computer machine is in its closed position, i.e., when the lid is completely folded over the machine body.

SUMMARY OF THE DISCLOSURE

For some conventional thin-type notebook personal computers, the speaker unit, which is of a relatively small size, is simply installed within the thin machine body. Thus, the speaker unit is not powerful enough to produce the acoustic effect that can satisfy the user's needs. Perhaps for some design considerations, the location on which the speaker unit may be placed is restricted. Often, the speaker is not placed in its proper position. For example, in some notebook personal computers, the speaker is only placed on the right side of the casing or machine body on which the keyboard is located.

In some cases, an external speaker unit that provides more powerful acoustic effect may be used in conjunction with the notebook personal computer machine. As the speaker unit is separate from the machine, the portability is affected.

Although a larger-size speaker may be installed within the computer, particularly machine body, so that sound of a wider range can be produced, it may occupy a larger space within the machine body accordingly, which may limit the space requirements that should be reserved for other units or devices, such as hard disk drive (HDD), liquid crystal display (LCD), keyboard, and so on, that are to be installed on the computer machine. The machine must be larger in order to meet such space requirements, which may also affect the machine's portability. As the recent trends show that the machine is becoming smaller and thinner, the machine size must be limited to the allowable minimum size in order to meet those needs. In those machines, no space might remain available to accommodate such a larger speaker.

When the speaker is placed on the side of the casing or machine body on which the keyboard is located, the sound quality (acoustic effect) from the speaker may be affected by a drive motor for the cooling fan or floppy disk (FD) drive, or by other associated units or devices mounted on the machine body that usually have complex configurations.

For those recent years, the display screen is becoming larger with the advance in the liquid crystal display (LCD) drive technology, and notebook personal computers, in which the full-scale display screen is mounted on the side of the lid by making full use of the total area of the lid, have appeared on the market. At present, there are none of the existing prior arts that can allow for the use of the larger speakers. That is, according to the existing prior arts, it is impossible to install the larger speaker within the lid where the larger display screen is present, since there is no space available. For example, all of the display screens according to the prior arts, such as the ones that are disclosed in the Japanese registered utility model JP-UM-3044340, the Japanese Patent Kokai Publication JP-A-8-307981, and the Japanese Patent Kokai Publication JP-A-9-311776, have a relatively small size so as to allow for the use of the larger speakers.

Most of the conventional notebook personal computers typically include CD-ROM drive, FD drive, PC card slot, connector ports, power switch, reset switch, volume control and so on, all of which are usually located on the lateral side ends of the casing or machine body that contains the keyboard thereon. In particular, as the software facilities or functions that are to be installed on the machine have proliferated for those recent years, the corresponding hardware components that are to be mounted on the machine are increasing. It can be seen from the above documents, however, that no means is provided for protecting the exposed portions of those components in some or other ways against any external/foreign unfavorable factors, such as scratches, dust, impacts and the like. For example, it may be noticed that the notebook personal computer, which is disclosed in the Japanese Patent Kokai Publication JP-A-5324124, implements no technological concept specifically designed to protect CD-ROM drive and the like.

An aspect of the present invention is therefore to provide a notebook personal computer machine that can accommodate any size of speakers without having to modify the size of the machine body, and allows the user easily to vary or adjust the angle of the speaker.

Another aspect of the present invention is to provide a notebook personal computer machine that implements means for protecting the floppy disk drive (FDD), PCMCIA slot, and the like installed on the machine body against scratches, dust, and impacts.

In one aspect of the present invention, the notebook personal computer machine includes a first casing (or machine body) on which a keyboard is located and which contains a computer in terms of a central processing unit (CPU) or processor, and a second casing (or lid) on which a display screen is located on the side thereof opposite the keyboard when the second casing (or lid) is in its closed-position and which is joined to the first casing by a hinge mechanism pivotally and swingably about the hinge mechanism so that it can be folded onto or unfolded away from the first casing, wherein the notebook personal computer machine further includes a third casing that contains a predetermined number of speakers and is joined to the lateral side edge of the second casing by means of hinges pivotally and swingably about the hinges so that the third casing can be folded onto or unfolded away from the lateral side edge of the first casing and is adapted to cover the lateral side edge of the first casing when the second casing is folded over the first casing.

In another aspect of the present invention, the third casing preferably has the form of a box that can make intimate contact with the lateral side edge of the first casing when the third casing is placed in its folded position.

In a further aspect of the present invention, the third casing preferably may be provided on each respective one of the lateral side edges of the second casing, in which both are swingable and foldable about the respective hinges.

In a still another aspect of the present invention, the third casing preferably may be adapted to cover the total area of each respective lateral side edge of the first casing when the third casing is placed in its folded position.

In a still further aspect of the present invention, the sound emitting face of the speaker within the third casing preferably may be located on the face of the third casing opposite each respective one of the lateral side edges of the first casing when the third casing is placed in its folded position.

In a still further aspect of the present invention, the first casing preferably may contain a predetermined number of ancillary electronic components, which may be installed within the machine body such that their exposed sides may be located on the lateral side edges of the first casing and can be covered by the third casing when the third casing is placed in its folded position.

In a still further aspect of the present invention, the ancillary electronic components preferably may include a reader and/or writer device (CD-ROM drive, FD drive, etc.) that is capable of reading and/or writing data and/or programs from and/or to electronic recording media such as CD-ROM, FD and the like, PC card slot, connector ports, power switch, reset switch, volume control, and so on.

PREFERRED EMBODIMENTS OF THE INVENTION

The acoustic effect (sound quality, acoustic vibrations) may be enhanced by providing a predetermined number of external speaker units or larger speaker units that may be mounted outside the notebook personal computer, rather than providing them inside either the casing or lid on which the display screen is located or the casing or machine body on which the keyboard is located. In this way, the ancillary electronics components, such as FD drive, CD-ROM drive and the like, that are installed inside the machine body such that their exposed sides may be located on the lateral side edges of the machine body can be protected by covering those exposed sides with a foldable case or box that contains the speaker units. The notebook personal computer machine preferably should include the features described above, which are further explained below in detail.

The notebook personal computer machine includes a first casing (or machine body) on which the keyboard is mounted and inside which a computer in the form of a central processing unit (CPU) or processor is installed, and a second casing or lid which is joined pivotally and swingably to the first casing by means of hinges so that it can be folded over the first casing and on which the display screen is mounted on the face thereof opposite the keyboard on the first casing when the second casing is placed in its folded position, wherein the notebook personal computer machine further includes a third casing or box that contains a speaker unit and is joined pivotally and swingably to the lateral side edge of the second casing by means of hinges, and wherein the sound emitting face of the speaker may be adjusted to any desired angle by swinging the first casing and/or the third casing about the respective hinges. In addition, the ancillary electronic components that are installed inside the first casing or machine body, with their exposed sides located on the lateral side edges of the first casing, may be protected against scratches, dust, impacts and so on by folding the second casing over the first casing and folding the third casing over the first casing in order to cover the exposed sides on the lateral side edges of the first casing.

Figure 1:
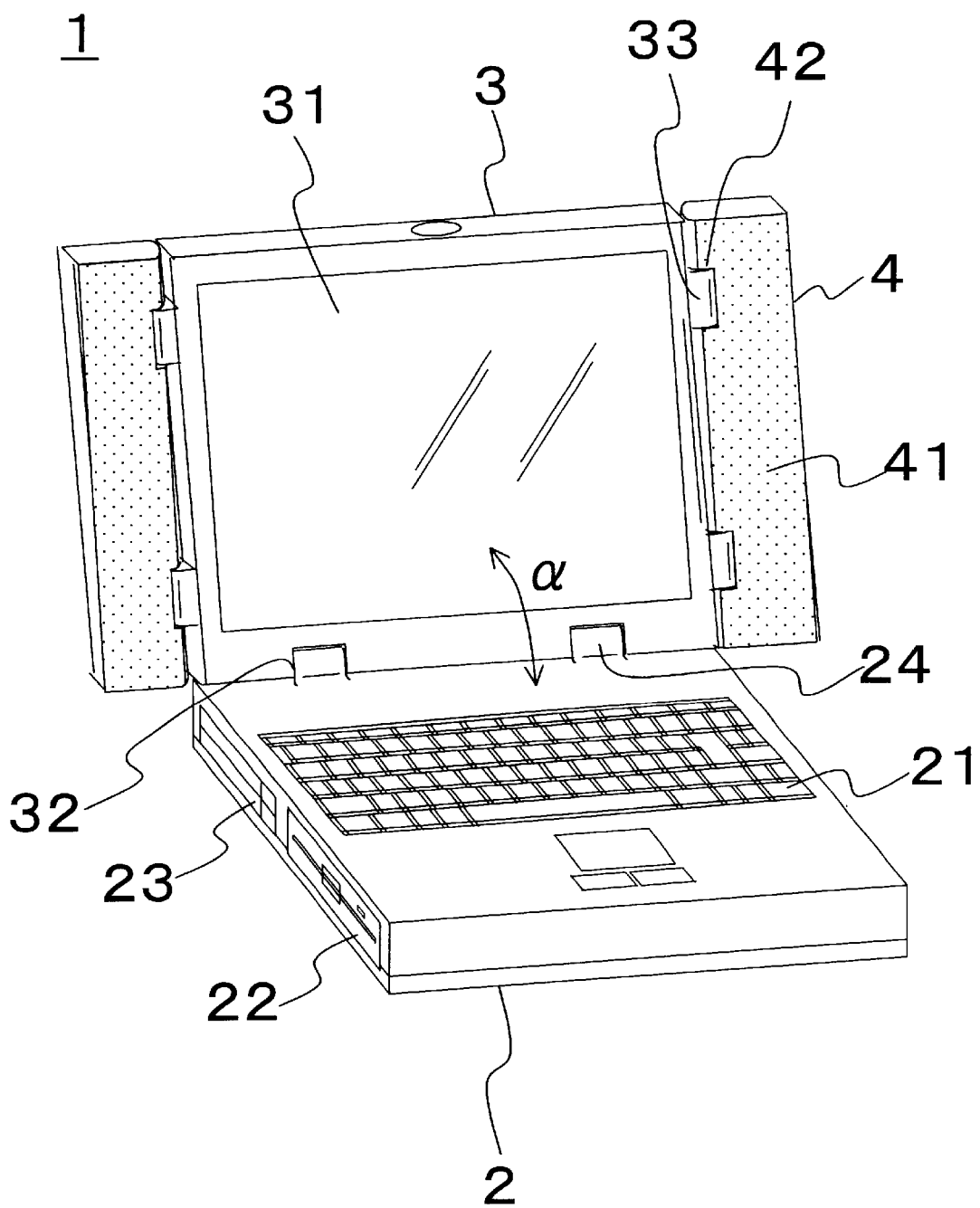
FIG. 1 is a perspective view of the notebook personal computer machine according to one preferred embodiment of the present invention when it is in its opened position.
Figure 2:
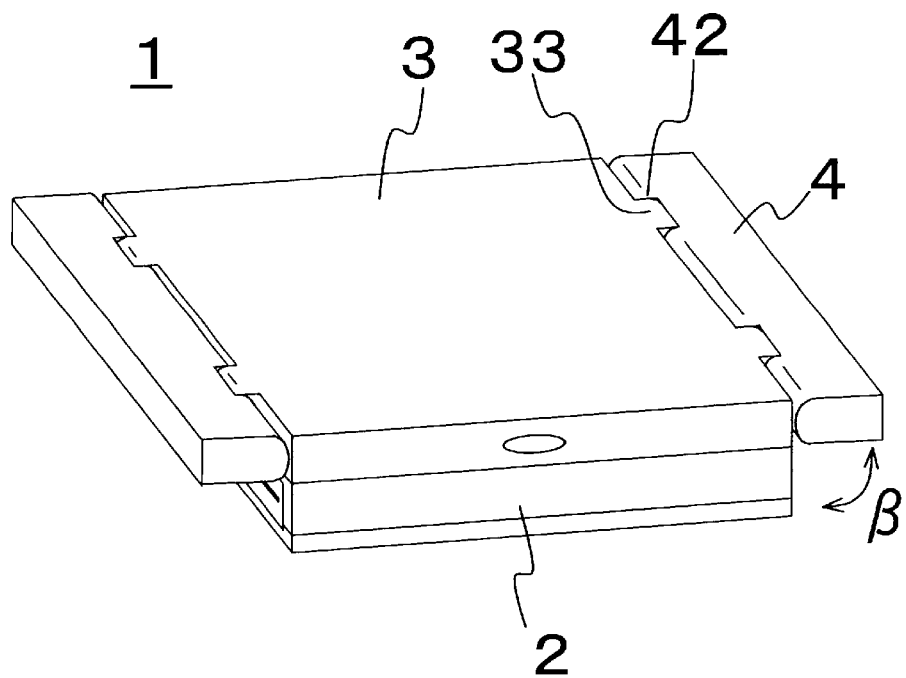
FIG. 2 is a perspective view of the notebook personal computer machine of FIG. 1 when it is in its closed position, in which (A) shows that the third casing is placed in its unfolded position and (B) shows that the third casing is placed in its folded position.
Figure 2:
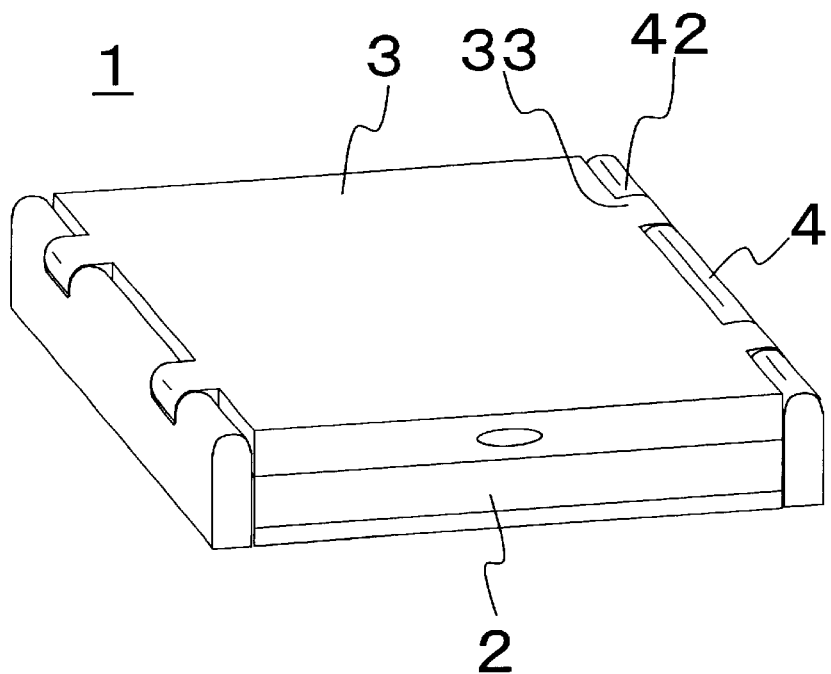

Now, a first preferred embodiment of the notebook personal computer machine according to the present invention is described by reference to the accompanying drawings. FIG. 1 is a perspective view of the notebook personal computer machine according to the first embodiment of the present invention, in which the machine is shown to be in its opened state. FIG. 2 is also a perspective view of the notebook personal computer machine according to the first embodiment of the present invention when the machine is in its closed state, in which (A) shows that the second casing is folded over the first casing, and (B) shows that the third casing is folded over the first casing. Generally, the notebook personal computer machine 1 includes the first casing 2, the second casing 3, and the third casing 4, as described above.

Specifically, the first casing 2 is the machine body that contains the system unit implemented by CPU or processor, including a keyboard 21 mounted on the surface, a floppy disk drive (FDD) 22 installed inside the machine body with its disk insertion side being exposed on the lateral side edge of the first casing 2, a PC card slot 23 installed inside the machine body with its card insertion side being exposed on the lateral side edge of the first casing 2, and a hinge portion 24 that may be mounted on the upper or lateral side of the first casing 2. In addition, the machine body may include a CD-ROM drive, connector ports, a power switch, a reset switch, a volume control, and so on, all of which may be provided on the lateral side edges of the first casing 2, although they are not shown. The hinge portion 24 is coupled with a first hinge portion 32 on the second casing 3 to permit the swinging motion of the second casing 3 about the combination of the hinge portions 24 and 32. Each of the opposite lateral side edges of the first casing 2 may be covered totally, and therefore may be protected, by folding the corresponding third casing 4 over the first casing 2. As the keyboard 21 and the display screen are placed to face opposite each other when the machine is closed, both may also be protected.

The second casing 3 is mounted pivotally and swingably to the upper or rear side of the first casing 2, and includes the display screen 31 disposed on the front surface as the second casing is opened as well as a first hinge portion 32 mounted on the bottom side edge of the second casing and a second hinge portion 33 mounted on each of the opposite lateral side edges of the second casing 3. The first hinge portion 32 is coupled (engaged) with the corresponding hinge portion 24 mounted on the first casing, so that the second casing 3 can swing about those hinge portions. The second hinge portion 33 is coupled with the corresponding hinge portion 42 mounted on the third casing 4, that the third casing can swing about those hinge portions. The display screen 31 on the second casing 3 may be placed to face opposite the keyboard 21 on the first casing 2 when the second casing is folded over the first casing, and both the display screen 31 and keyboard 21 may thus be protected.

The third casing 4 is mounted to the second casing 3 on each of the opposite lateral side edges thereof, and is symmetrical on both sides. Each of the third casings 4 contains a speaker, and has a sound emitting face 41 on the front side thereof when it is unfolded, and two hinge portions 42 along the lateral side thereof opposite the second casing 3. Each one of the two hinge portions 42 may mate with each corresponding one of two hinge portions 33 along the lateral side of the second casing. In this way, each of the third casings 4 may be supported by those hinge portions 42, 33 so that it can swing about the hinge portions making up a hinge mechanism. The sound emitting face 41 of the speaker may be placed to face opposite each respective one of the lateral side edges of the first casing 2 when the third casing 4 is folded. The sound emitting face 41 and other associated devices such as FDD 22 may thus be protected.

Figure 3:
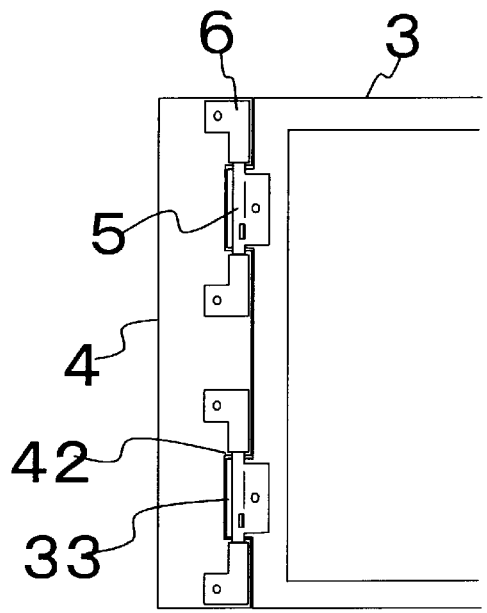
FIG. 3 shows details of the hinge portions 33, 42 between the second and third casings on the notebook personal computer machine of FIG. 1, in which (A) shows that the hinge portions are in the assembled state, (B) shows that the hinge portions are in the disassembled state, (C) shows one part in the hinge portion 33 formed like T letter, and (D) shows the other part in the hinge portion 42 formed like L letter.
Figure 3:
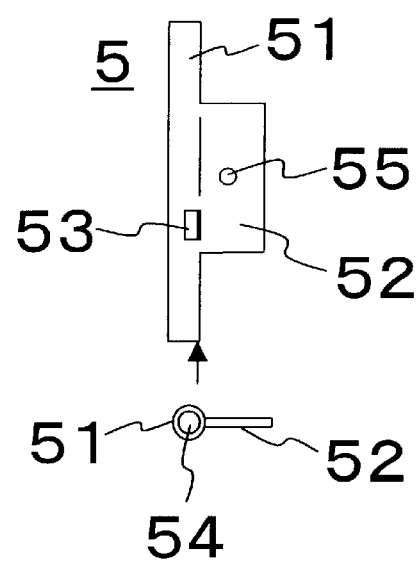
Figure 3:
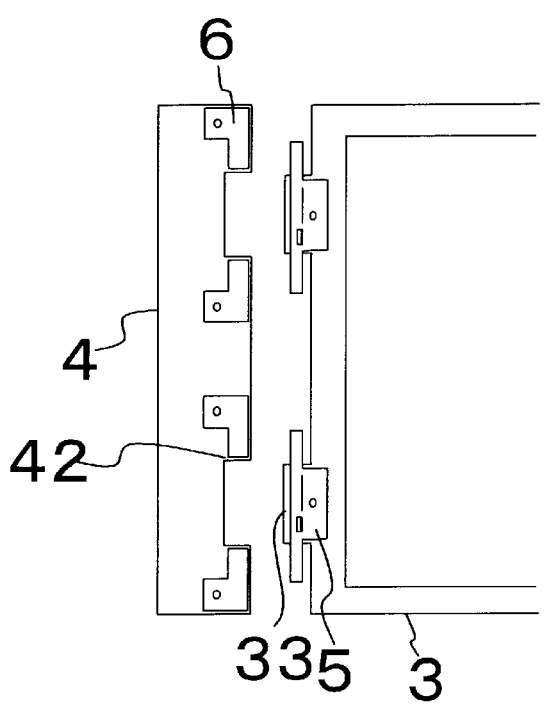
Figure 3:
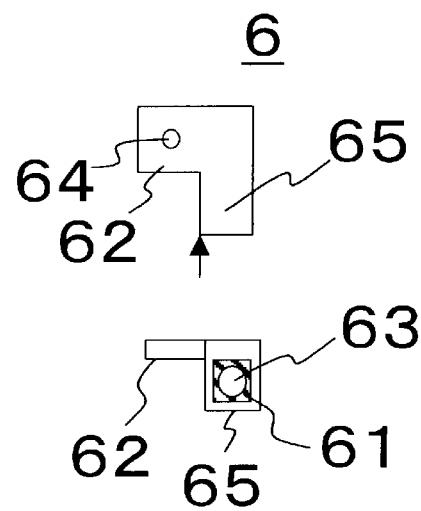

Details of the hinge portions on the notebook personal computer machine according to one embodiment of the invention, which have been described above, are now described by referring to FIG. 3. FIG. 3 shows the hinge portion on the notebook personal computer on an enlarged scale. On the one hand, each of the hinge portions 33 on the second casing 3 includes a metal part or piece 5 formed like the letter "T" as shown in FIG. 3(C), while each of the hinge portions of 42 on the third casing 4, on the other hand, includes a metal part or piece 6 formed like the letter "L" as shown in FIG. 3(D). The T- and L-shaped metal parts 5 and 6 form a pair. In FIG. 3, (A) shows the two metal parts assembled, and (B) shows the two metal parts as disassembled. Those hinge portions 33, 42 may join the second casing 3 and the third casing 4 by the combination of the T-shaped metal part 5 and the L-shaped metal part 6.

Specifically, the T-letter metal part 5 includes a transverse shaft portion 51 and a mounting portion 52, and may be fixed inside the second hinge portion 33 on the second casing 3 by means of a screw or the like. The transverse shaft portion 51 is formed like a hollow tube, which may be partly located outside the second casing when the metal part 5 is mounted. The shaft portion 51 further has holes 53, 53 through which electric wires may be passed. The mounting portion 52 is contiguous with the shaft portion 51, extending from the middle section of the shaft portion 51. The mounting portion 52 is formed like a plate that allows it to be attached to the second hinge portion 33. To this end, it has a screw hole 55 through which it may be fixed to the second hinge portion 33 by means of the screw.

The L-letter metal part 6 includes an anti-slip portion 61 and a mounting portion 62, and may be fixed within the hinge portion 42 on the third casing 4 by means of a screw or the like. The anti-slip portion 61 may be made of any elastic material like rubber, and has a hole 63 that accepts the shaft portion 51 of the T-letter metal part 5 and allows the shaft portion to be rotated easily and to be supported at certain angle. The mounting portion 62 is formed like a plate that allows it to be attached to the hinge portion 42 on the third casing. To this end, it has a screw hole 64 through which it may be fixed to the hinge portion 42 by means of the screw, and a rectangular frame 65 for fixing the anti-slip portion 61 in position.

By referring to FIGS. 1 and 2, the manner of using the notebook personal computer machine according to one embodiment of the present invention is described. When the second casing 3 is to be opened or closed this may occur by swinging the second casing 3 around the hinge portions relative to the first casing 2 in the direction of a double arrow α in FIG. 1. Similarly, when the third casing 4 is to be opened or closed, this may occur by swinging the third casing 4 around the hinge portions relative to the second casing 3 in the direction of a double arrow β in FIG. 2. When the machine is to be closed, this may occur by folding the second casing toward the first casing in the direction of a and then folding the third casing toward the first casing in the direction of β. When the machine is to be reopened, the above steps may be reversed.

The meritorious effects of the present invention are summarized as follows.

The first advantage of the present invention is to permit the third casing containing the speaker to be mounted externally, and therefore to allow for the use of a larger speaker. As a consequence, this may free the physical space that was occupied by the speaker in the prior art. This space may be used for installing other devices, or may be saved. In addition, the present invention is advantageous in that the third casing containing the speaker may be provided symmetrically on each of the lateral side edges of the second casing, and both of the third casings may be swingable about the respective hinge portions. Thus, sound may be produced from the two speakers on both sides, which may enhance the acoustic effect.

The second advantage of the present invention is to allow the opposite lateral side edges of the first casing to be covered by the corresponding third casings, when the third casings are placed in their respective folded positions by swinging them about the hinge portions. This may protect the exposed portions of FD drive, CD-ROM drive, connectors and so on that are installed inside the machine body. Each of the third casings may have the speaker's sound emitting face on the side thereof that will face opposite the lateral side edge of the first casing when the third casing is placed in its folded portion.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A notebook personal computer machine comprising:
   a first casing having a keyboard on its surface and containing a computer in terms of a central processing unit (CPU) or processor; and
   a second casing mounted pivotally to said first casing by a first hinge mechanism so that said second casing can swing about the hinge mechanism toward or away from said first casing and having a display screen on a face opposite the keyboard on said first casing when said second casing is folded over said first casing, wherein the notebook personal computer machine further comprises:

a third casing mounted pivotally to a lateral side of said second casing by a second hinge mechanism so that said third casing can swing about the hinge mechanism and containing a predetermined number of speakers, said third casing being adapted to cover the lateral side edge of said first casing when said second casing is folded over said first casing, wherein said second hinge mechanism comprises:

a T-shaped metal part mounted on said second casing and having a mounting portion contiguous with a transverse shaft portion; and an L-shaped metal part mounted on said third casing and having a mounting portion contiguous with an anti-slip portion receiving said shaft portion, said anti-slip portion allowing easy rotation of said third casing with respect to said second casing while at the same time supporting said third casing at an angle with respect to said second casing.

2. The notebook personal computer machine as defined in claim 1, wherein said third casing has a form of a box that is foldable toward said first casing and can be accepted by the lateral side edge of said first casing when said third casing is placed in its folded position.

3. The notebook personal computer machine as defined in claim 1, wherein said third casing is disposed on each of the lateral side edges of said second casing so that both are swingable about the pair of the hinge portions.

4. The notebook personal computer machine as defined in claim 1, wherein said third casing overlaps each respective one of the lateral side edges of said first casing when said third casing is placed in its folded position.

5. The notebook personal computer machine as defined in claim 1, wherein a sound emitting face of said speaker is located on the side of said third casing opposite each respective one of the lateral side edges of said first casing when said third casing is placed in its folded position.

6. The notebook personal computer machine as defined in claim 1, wherein said first casing contains a predetermined number of ancillary electronic components, units or devices therein, and wherein the exposed sides of said ancillary electronic components, units or devices are located on the lateral side edges of said first casing opposite said third casing when said third casing is placed in its folded position.

7. The notebook personal computer machine as defined in claim 6, wherein said ancillary electronic components comprise a reader and/or writer device that is capable of reading and/or writing data and/or programs from and/or to electronic recording media.

8. The notebook personal computer machine as defined in claim 1, wherein the anti-slip portion of the L-shaped metal part is made of an elastic material and has a hole that accepts the shaft portion of the T-shaped metal part.

9. The notebook personal computer machine as defined in claim 8, wherein the transverse metal shaft portion of the T-shaped metal part is hollow and has a hole through which electric wires may be passed.

* * * * *